United States Patent
Bowes

(10) Patent No.: US 10,954,110 B2
(45) Date of Patent: Mar. 23, 2021

(54) REMOVABLE WINCH HANDLE ASSEMBLY AND METHOD THEREOF

(71) Applicant: Quadratec, Inc., West Chester, PA (US)

(72) Inventor: David M. Bowes, Glenmoore, PA (US)

(73) Assignee: Quadratec, Inc., West Chester, PA (US)

( * ) Notice: Subject to any disclaimer, the term of this patent is extended or adjusted under 35 U.S.C. 154(b) by 219 days.

(21) Appl. No.: 15/972,737

(22) Filed: May 7, 2018

(65) Prior Publication Data
US 2019/0337779 A1 Nov. 7, 2019

(51) Int. Cl.
*F16H 21/00* (2006.01)
*B66D 1/74* (2006.01)
*F16H 21/44* (2006.01)

(52) U.S. Cl.
CPC ........... *B66D 1/7468* (2013.01); *F16H 21/44* (2013.01)

(58) Field of Classification Search
CPC ..... B66D 1/7469; F16H 21/44; F16H 19/001; F16H 37/12; F24F 13/10; F24F 2013/1433; F16K 31/043
See application file for complete search history.

(56) References Cited

U.S. PATENT DOCUMENTS

| | | | | |
|---|---|---|---|---|
| 5,096,156 | A * | 3/1992 | Wylie | B60H 1/00678 251/129.11 |
| 7,188,481 | B2 * | 3/2007 | DeYoe | F24F 13/1426 236/49.3 |
| 8,342,148 | B2 * | 1/2013 | Liimatta | F02D 9/106 123/336 |
| 2014/0260797 | A1 * | 9/2014 | Maddox | F16H 21/44 74/99 R |
| 2015/0107382 | A1 * | 4/2015 | Chang | D06F 17/08 74/17 |
| 2017/0176044 | A1 * | 6/2017 | Kezar | F16H 21/44 |
| 2018/0112722 | A1 * | 4/2018 | Kim | F16D 28/00 |
| 2018/0119626 | A1 * | 5/2018 | Wightman | H02K 7/14 |
| 2018/0239301 | A1 * | 8/2018 | Kudo | F16C 17/04 |
| 2018/0313457 | A1 * | 11/2018 | Shen | F16K 11/0856 |
| 2018/0347720 | A1 * | 12/2018 | Mariano | F16K 5/0652 |
| 2019/0091848 | A1 * | 3/2019 | Walker | B25F 5/00 |
| 2019/0107224 | A1 * | 4/2019 | Block | F16K 21/12 |

* cited by examiner

Primary Examiner — Zakaria Elahmadi

(57) ABSTRACT

A removable winch handle assembly for engaging a winch gear within a gearbox comprises: a handle receiver having at least a portion thereof exposed outside the gearbox, a seal between the handle receiver and the gear box, an engagement mechanism in the gearbox, the engagement mechanism coupled to the handle receiver to rotate with the handle receiver, wherein rotation of the engagement mechanism engages the winch gear, and a winch handle selectively coupled to the handle receiver, wherein, rotation of the winch handle causes rotation of the handle receiver when attached, the winch handle detachable from the handle receiver, wherein the gearbox opening is sealed by the seal when the winch handle is detached from the handle receiver.

20 Claims, 8 Drawing Sheets

REMOVABLE WINCH HANDLE ASSEMBLY AND METHOD THEREOF

FIELD OF THE INVENTION

The present invention relates to winches, and more particularly to winches with clutches. Specifically, a method and apparatus are described with regard to a winch that includes a removable clutch handle.

BACKGROUND OF THE INVENTION

A winch is a mechanical device that is used to pull in (wind up) a rope or wire rope (also called a "cable" or "wire cable"). One type of winch, in particular, is motorized and is attached to the front of a sports utility vehicle (SUV) or truck. Such a winch is highly desirable when an SUV is disabled (stuck). For example, if an SUV is in a low stream or muddy bog, the SUV may not be able to achieve sufficient traction in order to move. Many other types of wet conditions, including submersed conditions, can also result in a disabled SUV.

A winch for SUV applications (for example) comprises a spool on which the cable is wound, a motor to rotate the spool, one or more gears to transfer power from the motor to the spool, and a clutch mechanism to disengage the spool from the motor.

During normal operation of an SUV, the winch is typically attached to the front of the SUV in a powered down state with the cable fully wound around the spool. In this configuration, the spool is fully engaged with the motor. When the spool is fully engaged with the motor, if the motor is energized, the spool can spin, but if the motor is not energized, then the drag of the motor (and the locked state of gears between the spool and the motor) prevents the spool from spinning. If the spool is prevented from spinning, then an operator is prevented from unwinding the cable from the spool by pulling on the cable (while the motor is not energized).

To free an SUV that is stuck, the cable is desirably unwound from the spool, and the cable is attached to a large heavy and/or immovable object such as a rock or a tree. In order to unwind the cable from the spool, the clutch is provided. The purpose of the clutch is to disengage the motor from the spool so that the cable can be unwound. Once the cable has been unwound and attached to the heavy and/or immovable object, the clutch is operated to re-engage the motor and the spool. After the motor and spool are re-engaged, the motor can be operated in order to provide torque to the spool so that tension is placed on the cable as the cable is wound about the spool. The tension on the cable provides sufficient force so that the SUV is freed from its stuck state and driving of the SUV can resume.

Operation of the mechanism that engages/disengages the motor and the spool is illustrated in prior art FIG. 1 and prior art FIG. 2. FIGS. 1 and 2 illustrate clutch engagement pivot 125. Button 160 extends from the bottom of clutch engagement pivot 125 and is offset relative to the axis of rotation of clutch engagement pivot 125. When clutch engagement pivot 125 is rotated, there is an axial movement of button 160. Button 160 engages channel 175 that is formed in engagement gear 170. Thus, when clutch engagement pivot 125 is rotated, engagement gear 170 slides laterally and engages a plurality of other gears (for example planetary gears) that transfer torque to the spool (not shown) and cause the spool to rotate. In this manner the motor is engaged with the spool, with the result of a) when the motor rotates, the spool rotates, and b) when the motor is not powered, rotation of the spool is prevented.

Such a system is referred to as a clutch, because it couples and decouples (engages and disengages) the motor from the spool.

When the motor is not coupled to (or engaged with) the spool, the spool is in a "free spin" mode. In this mode, the cable can readily be unwound from the spool by hand.

Thus, if an SUV (equipped with a winch) is stuck and cannot be driven for whatever reason, the clutch is rotated to disengage the spool from the motor, the cable is unwound from the spool and attached to an immovable object, the clutch is rotated to engage the spool and the motor, the motor is energized to apply torque to the spool, the spool rotates to place tension on the cable, the SUV is pulled out of its stuck state (with or without assistance from the SUV's engine), the cable is detached from the inanimate object, the motor is actuated again to fully wound the cable about the spool, the motor is powered down, and the SUV is driven away.

Winches, unfortunately, are prone to vandalism. The cables, for example, are very pricey. A thief may approach an unattended SUV, turn the clutch knob, unroll the cable from the spool, unbolt the cable, and sell the cable as stolen goods. Or, someone seeking to perform mischief may unroll the cable from the spool, and leave the cable in an unrolled state on the street. If the SUV owner does not notice the cable lying in the street, the SUV owner may simply start to drive his SUV, and drag the cable along the street. Such an occurrence may result in damage to the cable, damage to other vehicles, or may even cause an accident.

SUMMARY OF THE INVENTION

A removable winch handle assembly for engaging a winch gear within a gearbox comprises: a handle receiver having at least a portion thereof exposed outside the gearbox, a seal (such as an O-ring) between the handle receiver and the gear box, an engagement mechanism in the gearbox, the engagement mechanism coupled to the handle receiver to rotate with the handle receiver, wherein rotation of the engagement mechanism engages the winch gear, and a clutch handle selectively coupled to the handle receiver, wherein, rotation of the clutch handle causes rotation of the handle receiver when attached, the clutch handle detachable from the handle receiver, wherein the gearbox opening is sealed by the seal when the winch handle is detached from the handle receiver.

DETAILED DESCRIPTION

As explained above, a winch cable is subject to various concerns. During normal operation of a winch equipped SUV, the winch is typically attached to the front of the SUV. When the SUV is unattended, it is easy for someone to approach the SUV and tamper with the winch. In the prior art, the winch's clutch handle is in plain view and easily manipulated. A person could easily approach the SUV, turn the clutch handle to disengage the spool from the motor, and unroll the winch cable. In this manner, the winch cable (which is often very pricey) can be stolen, or if mischief is desired, can be left on the street. If the SUV driver does not notice that the winch cable has been unwound, he may drive away with the winch cable in an unrolled state, resulting in a high probability of damage or accident.

Part of the reason that a winch is so easy to tamper with is because the clutch handle is simple to operate and readily accessible to anyone passing the winch on the street. The inventor of the present invention is not aware of clutch handles in the prior art that include features for preventing unwanted clutch manipulation. Thus, features to prevent unwanted clutch operation are highly desirable.

One solution to the fact that clutch handles are easily tampered with is to remove the clutch handle when not in use. In this manner, there is nothing obvious for someone to "grab onto" in order to operate the clutch. With nothing to "grab onto," the clutch becomes very difficult to operate even though the winch is in plain view. As a result, tampering with the winch and unrolling the winch cable is avoided.

A clutch handle in an exemplary embodiment of the present invention may be attached to other portions of the winch using a set screw, but simply removing a set screw in order to remove a clutch handle does not solve the problems identified above. Because a winch equipped SUV has a winch that is exposed to outdoor conditions, possibly 365 days a year, a winch needs to be constructed so that it can withstand the elements. If rain, snow, or other sources of moisture enter the interior of a winch, the winch is subject to damage and/or destruction as internal electronic components (such as the motor) get wet. Typically, the clutch handle is coupled to the winch in a manner so that moisture is prevented from getting inside the winch. With the clutch handle removed, openings to the interior of the winch are exposed, and moisture can easily enter the interior of the winch and cause damage to its interior.

Thus, to address at least one of the problems identified above, it would be desirable to provide a winch with a clutch handle that can be removed, whereby removal of the clutch handle maintains the winch's waterproof characteristics.

Accordingly, in an exemplary embodiment of the present invention, the clutch handle is removable in a manner that maintains the desirable weatherproof characteristics of a winch.

Figure 3:
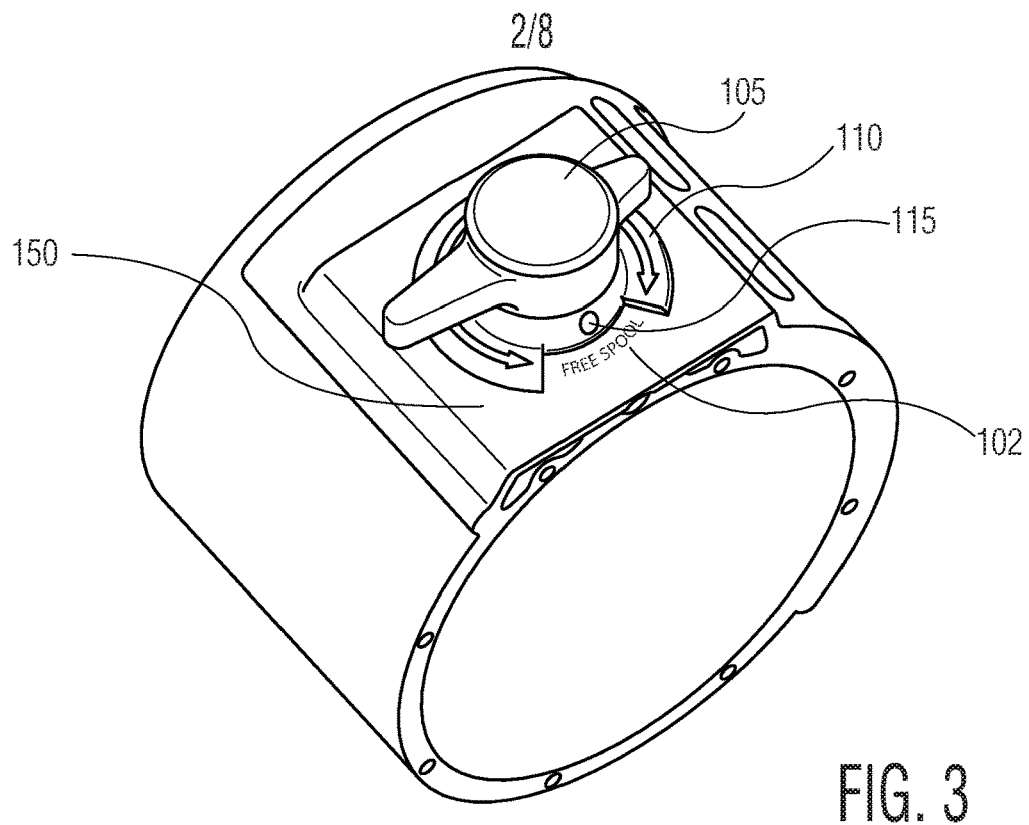
FIG. 3 is a perspective view of a clutch handle in a free spool configuration in accordance with an exemplary embodiment of the present invention.

FIG. 3 illustrates a perspective view of clutch handle 105 so that winch handle assembly 100 has a clutch in a free spool configuration in accordance with an exemplary embodiment of the present invention. Clutch handle 105 may be a knob, as shown, that extends outwardly from winch housing 150. Handle 105 may include a plurality of projections extending horizontally in opposite directions to facilitate turning handle 105 with a hand. Handle 105 is coupled to handle receiver 110 below so that rotation of handle 105 causes rotation of handle receiver 110.

Figure 4:
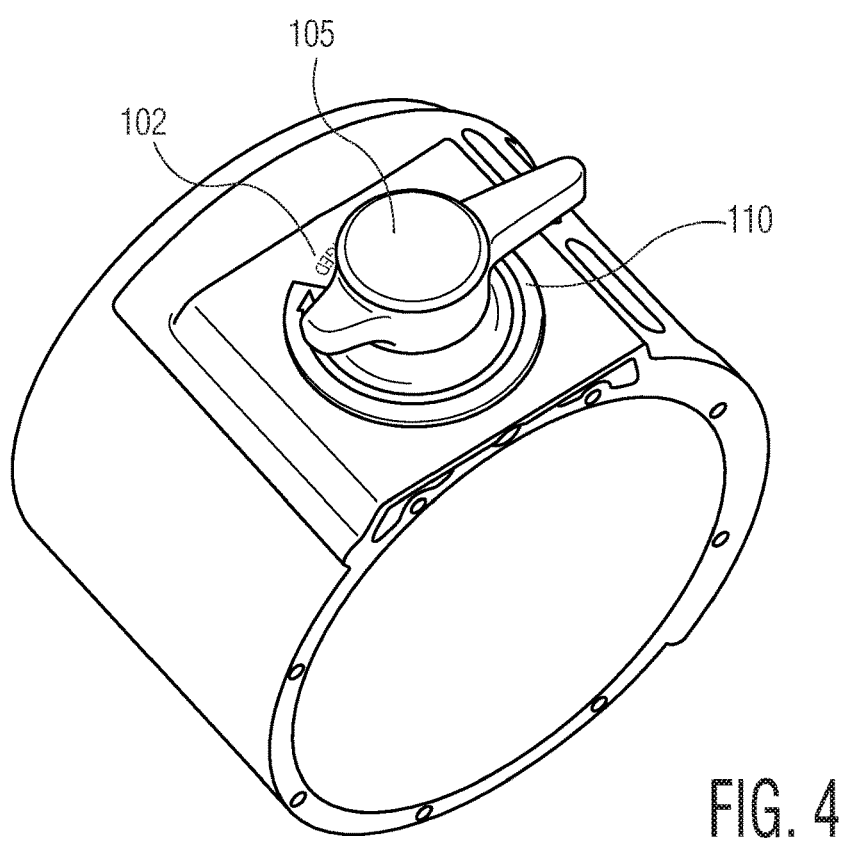
FIG. 4 is a perspective view of a clutch handle in an engaged configuration in accordance with an exemplary embodiment of the present invention.

Handle receiver 110 includes notch 102 to reveal text that appears on the exterior of winch housing 150. The text indicates the state of the clutch. In FIG. 3, notch 102 reveals the text FREE SPOOL to indicate that the winch is in a free spool state (i.e. the spool is not engaged to the motor, and therefore, the cable can be unwound from the spool by hand). FIG. 4 shows handle 105 rotated 180 degrees. Notch 102 in FIG. 4 reveals the text ENGAGED to indicate that the winch is in an engaged state (i.e. the spool is engaged to the motor, and therefore, the cable cannot be unwound from the spool by hand).

Optional upper retention member 115 is shown in FIG. 3. Upper retention member 115 may be a set screw (for example). Upper retention member may be used to affix clutch handle 105 to handle receiver 110.

At this time, it may be useful to define "clutch." What is meant by "clutch" is any and all structure that engages and disengages the winch's motor from the winch's spool. When the "clutch" is engaged, the winch motor and spool are engaged, so that the cable cannot be unwound from the spool (without the spool receiving torque from the motor). When the "clutch" is disengaged, the motor and the spool are not engaged, and therefore the spool can rotate freely (particularly when the motor is not energized), and the cable can be unwound from the spool by hand.

Figure 5A:
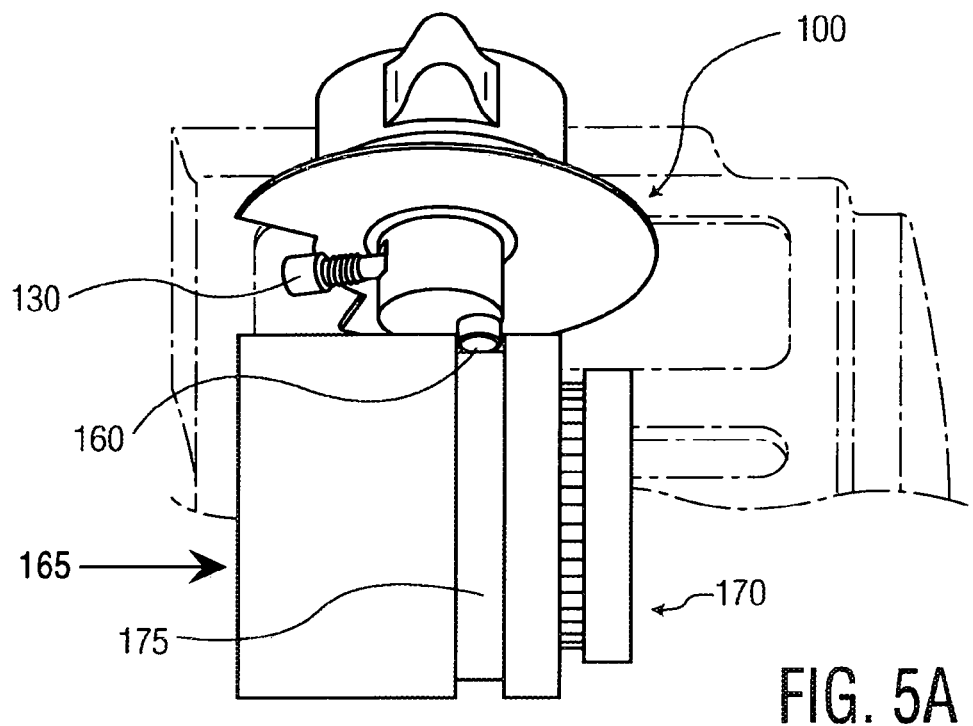
FIG. 5a is a perspective drawing that shows the underside of a winch handle assembly in an engaged configuration in accordance with an exemplary embodiment of the present invention.

FIG. 5a is a perspective drawing that shows the underside of a winch handle assembly in an engaged configuration in accordance with an exemplary embodiment of the present invention. For purposes of explanation, the "clutch" can be thought of as clutch handle 105, winch handle assembly 100, and the groove 175 in gear 165 (shown in FIGS. 1 and 2) that is engaged by button 160.

In FIG. 5a, button 160 extends from clutch engagement pivot 125 as shown. Clutch engagement pivot 125 is shown extending from the bottom of handle receiver 110. Handle receiver 110 is shown extending from the bottom of winch handle 105.

Figure 5B:
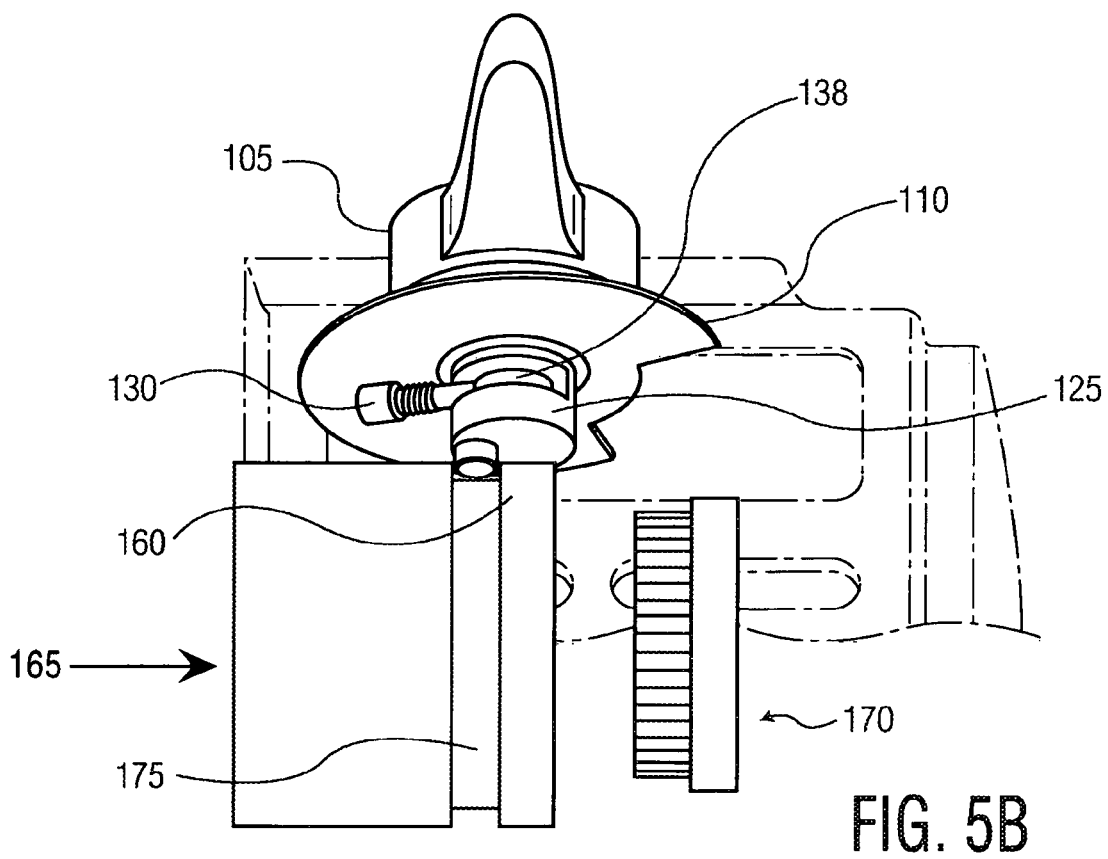
FIG. 5b is a perspective drawing that shows the underside of a winch handle assembly in a free spool configuration in accordance with an exemplary embodiment of the present invention.

In FIG. 5a, winch handle assembly 105 gear 165 to become ENGAGED with gear 170 because of the position of button 160. FIG. 5b illustrates winch handle assembly 105 causes gear 165 to FREE SPOOL relative to gear 170 because button 160 has rotated 180 degrees. The rotation of button 160 by 180 degrees is also a lateral movement of button 160, that results in gear 165 (shown in FIGS. 1 and 2) shifting and either engaging the motor or free spooling relative to the motor.

Figure 1:
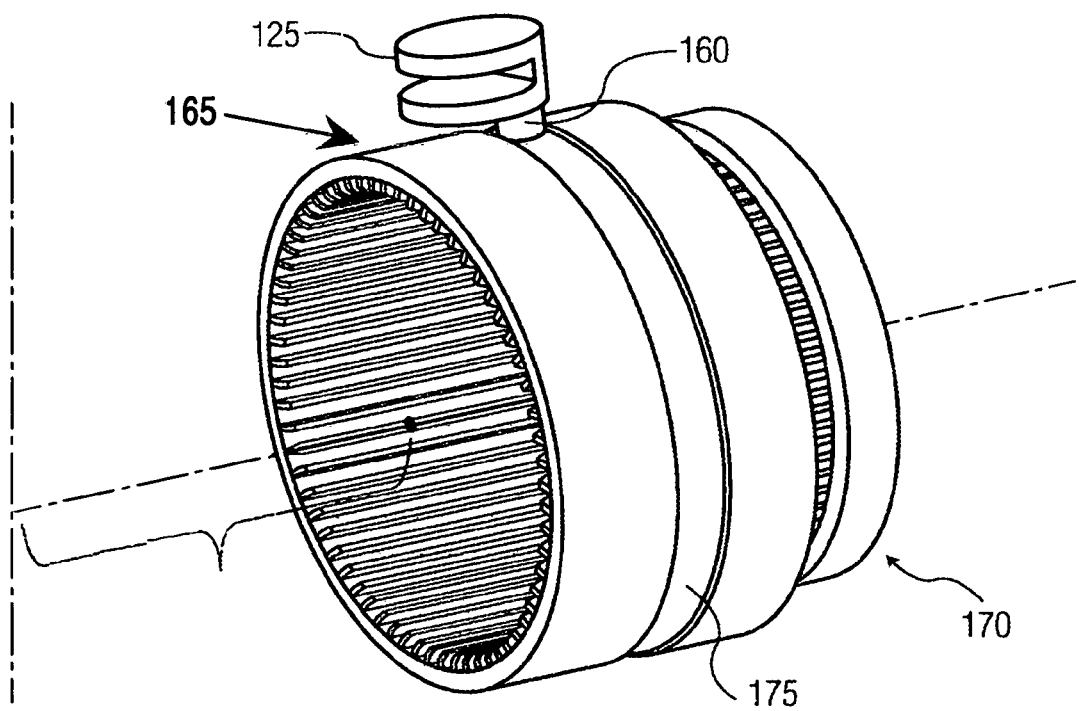
FIG. 1 is a perspective drawing that illustrates an engaged configuration (a first position) of an engagement gear in accordance with the prior art.
Figure 2:
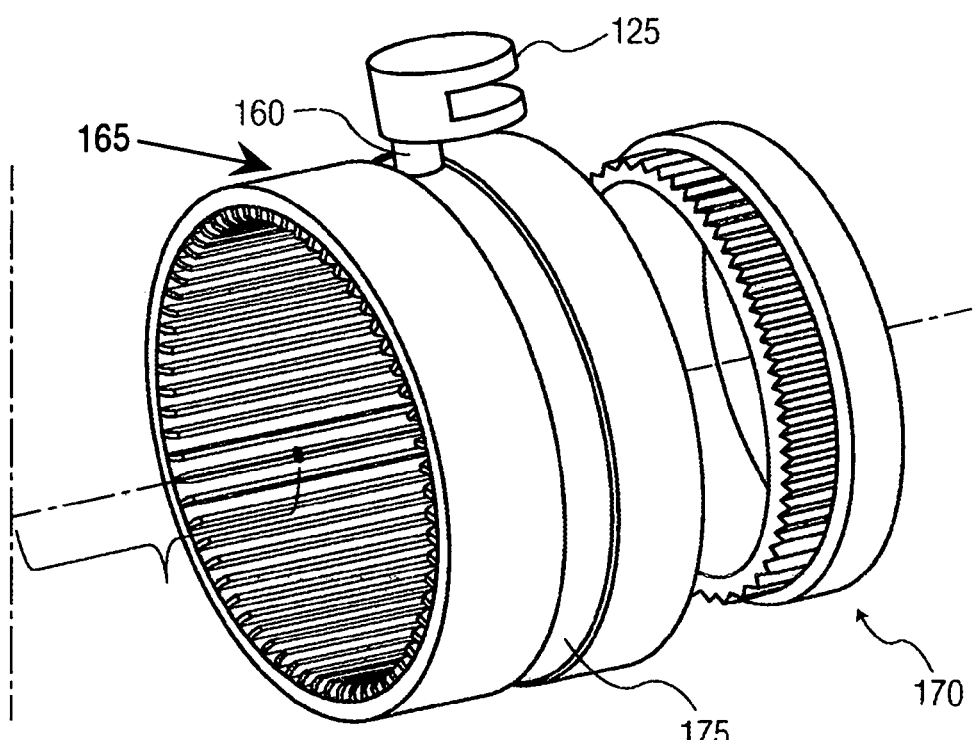
FIG. 2 is a perspective drawing that illustrates a disengaged (free spool) configuration (a second position) of an engagement gear in accordance with the prior art.
Figure 6:
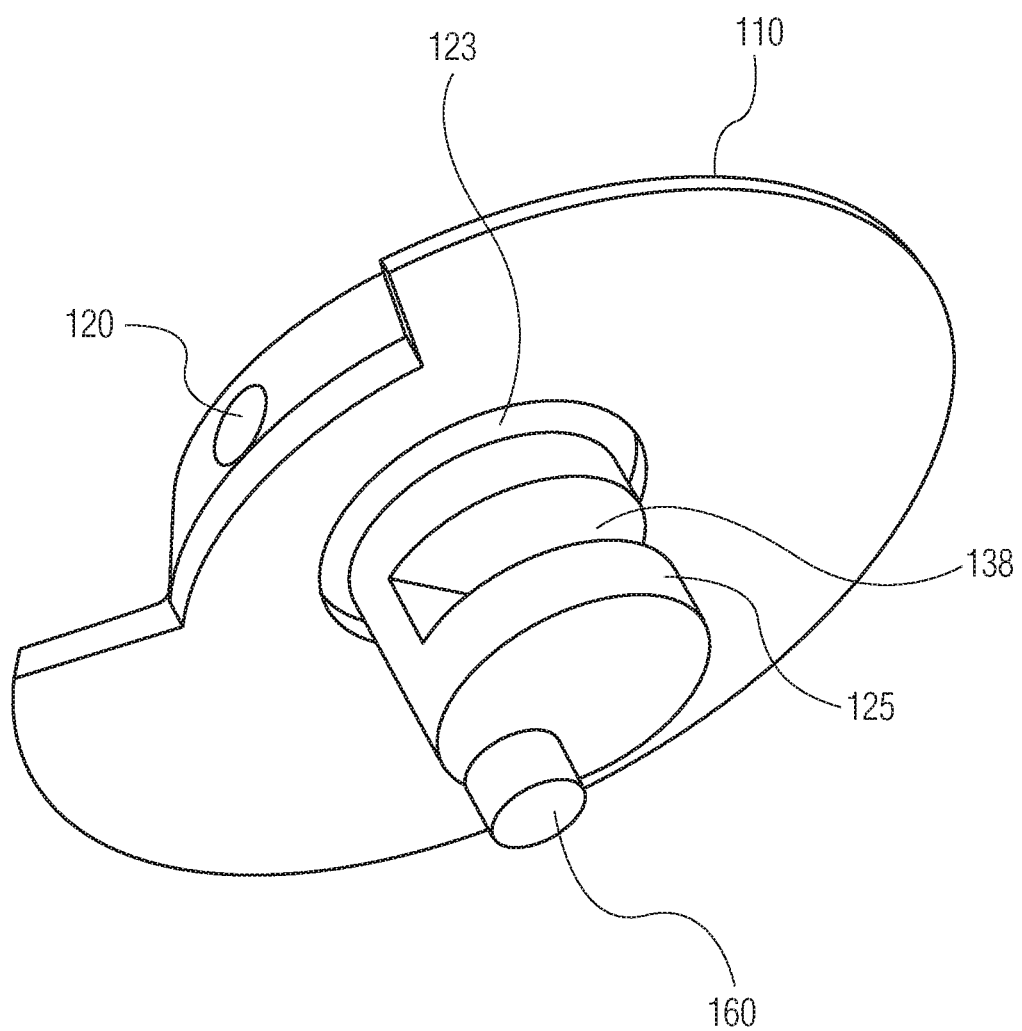
FIG. 6 is a perspective drawing that shows a clutch engagement pivot and a handle receiver in accordance with an exemplary embodiment of the present invention.

FIG. 6 is a perspective view of clutch engagement pivot 125 and handle receiver 110. Clutch engagement pivot 125 and handle receiver 110 are shown integrated as a single manufactured part, but this is merely exemplary. Clutch engagement pivot 125 slides into winch housing opening 155 (shown in FIG. 7). Lower retention member 130 is inserted into opening 131, and is attached to winch housing 150 via threads that engage corresponding threads within opening 131. The engagement of these threads is better illustrated in FIG. 8 and is described below. Lower retention member 130 extends into slot 138, and thus maintains clutch engagement pivot 125 within winch housing opening 155. Lower retention member 130 extends part way into slot 138 so that clutch engagement pivot 125 can rotate about axis X within winch housing opening 155. Slot 138, however, extends halfway (for example) into clutch engagement pivot 125 to create a "halfmoon" shape. This halfmoon shape allows rotation of clutch engagement pivot 125 to be limited (for example to 180 degrees). As clutch engagement pivot 125 rotates, so does button 160. 180 degree (for example) rotation of button 160 results in a translational change in the position of button 160, thus causing engagement gear 165 to slide as illustrated in FIG. 1 and FIG. 2.

Figure 7:
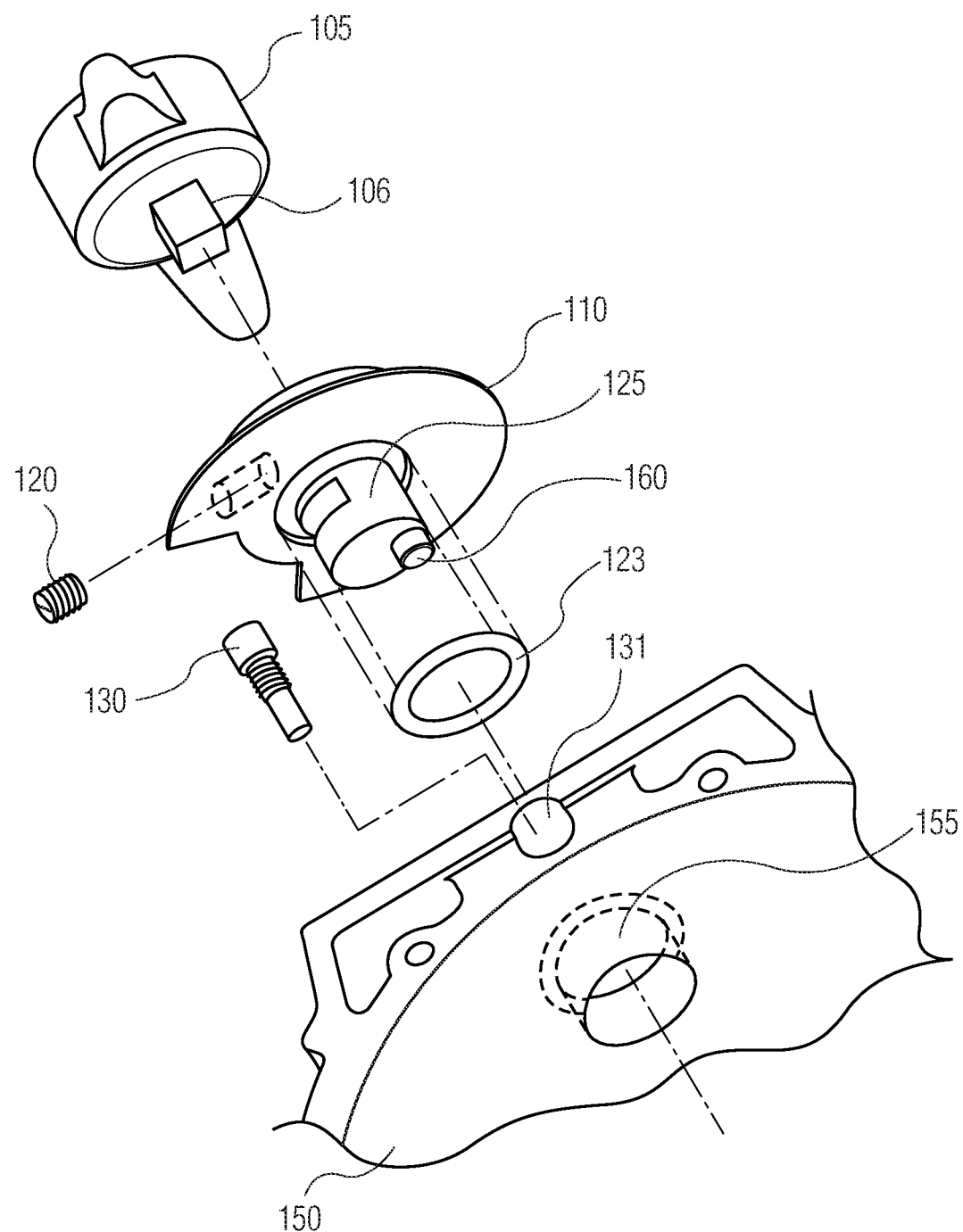
FIG. 7 is an exploded view of a winch handle assembly in accordance with an exemplary embodiment of the present invention.

Seal 123 is shown in FIG. 7 about clutch engagement pivot 125 and abutting the bottom surface of handle receiver 110. Seal 123 creates a weatherproof seal between handle receiver 110 and winch housing 150. Thus, if clutch handle 105 is removed, a weatherproof seal between handle receiver 110 and winch housing 150 stays in place. In this manner, the components that are interior to winch housing 150 are protected from the elements (rain, snow, dirt, humidity, etc.).

FIG. 7 is an exploded view of winch handle assembly 100 in accordance with an exemplary embodiment of the present invention. FIG. 7 illustrates a feature that plays a role in the winch's weatherproof characteristics, namely seal 123 (e.g. an o-ring or an x-ring). A seal is comprised of a flexible material such as rubber. As shown in FIG. 7, seal 123 is in a channel between winch housing 150 and handle receiver 110. In this manner, a seal is formed between the bottom of handle receiver 110 and the exterior of winch housing 150.

FIG. 7 illustrates clutch engagement pivot 125 with button 160 extending therefrom at the bottom of the figure. Clutch engagement pivot 125 resides in winch housing opening 155 and rotates therein. Along the exterior of winch housing 150, seal 123 is situated. Next, handle receiver 110 is placed on top of seal 123. In this manner, a weather tight seal is formed by winch housing 150, seal 123 and handle receiver 110, while at the same time allowing handle receiver 110 (and thus button 160) to rotate. Clutch handle 105 attaches to the top of handle receiver 110. Attachment may occur by winch handle protrusion 106 and handle receiver recess 111 mating. While protrusion 106 is male and recess 111 is female, the configuration may be switched from a male/female configuration to a female/male configuration.

Figure 8:
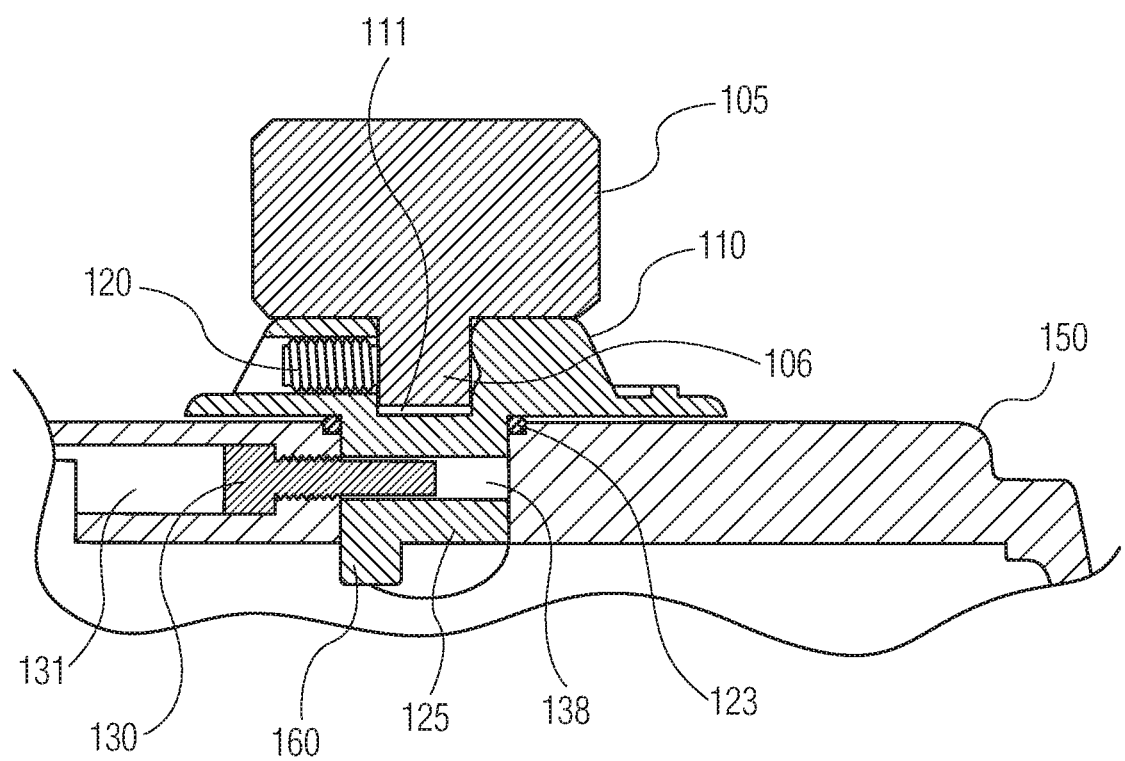
FIG. 8 is a cross sectional view of the exemplary embodiment illustrated in FIG. 7.

FIG. 8 is a cross sectional view of the exemplary embodiment illustrated in FIG. 7. The weather tight properties of winch handle assembly 100 can be appreciated from the position of seal 123 is this figure. FIG. 8 also illustrates an exemplary manner of attaching lower retention member 130 to winch housing 150. In this example, lower retention member 130 is a threaded member that engages a partially threaded opening in winch housing 150. In this manner, a portion of lower retention member 130 extended into slot 138 in order to guide clutch engagement pivot 125 as clutch engagement pivot 125 is rotated.

Figure 9:
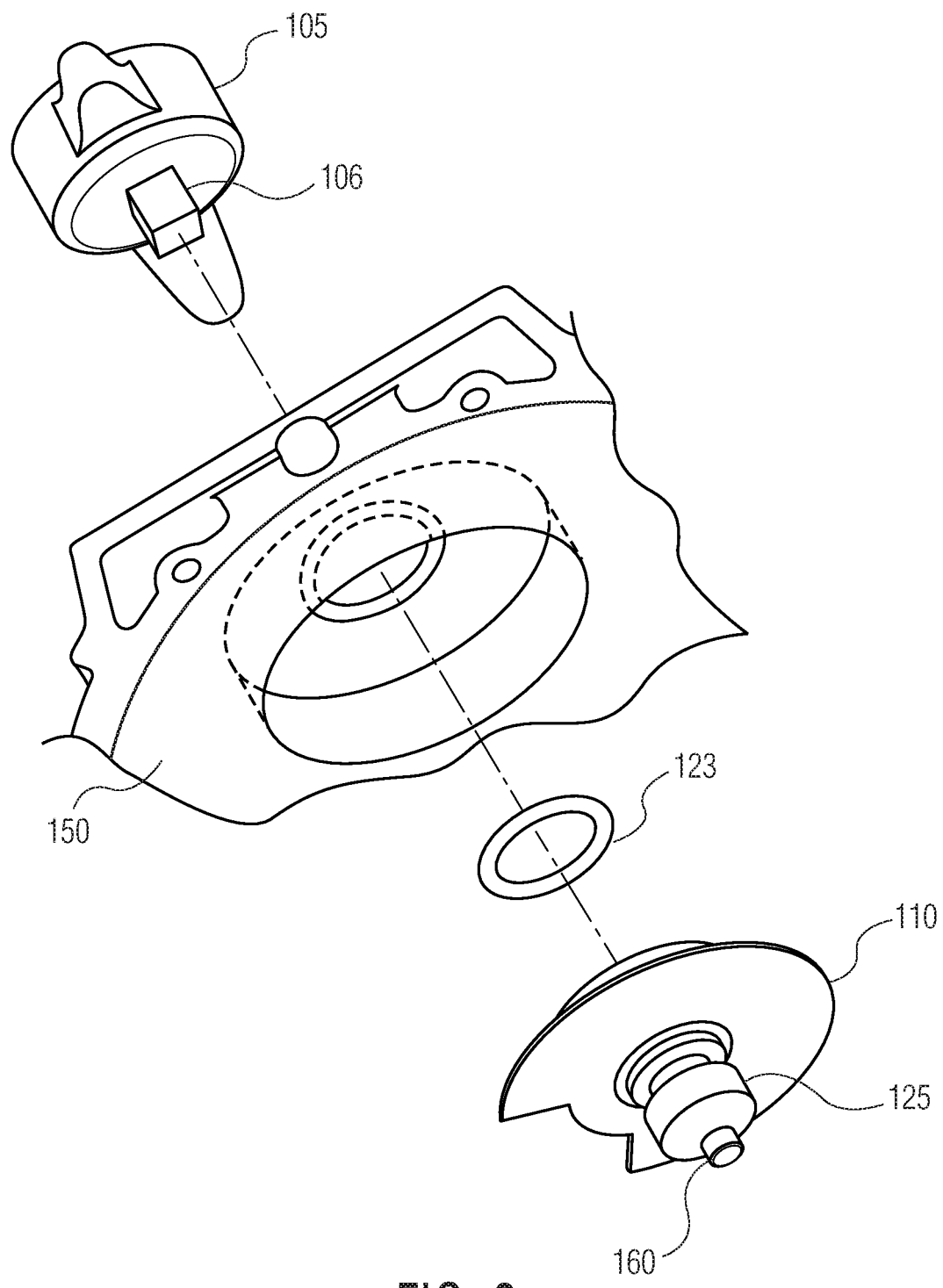
FIG. 9 is an exploded view of a winch handle assembly in accordance with a further exemplary embodiment of the present invention.

FIG. 9 is an exploded view of a winch handle assembly in accordance with a further exemplary embodiment of the present invention. This figure shares similarities with FIG. 7, but the position of some components has been changed, and some structures have been modified to accommodate the change of position of some components. Button 160 extends from clutch engagement pivot 125 and button 160 engages slot 175 within gear 170. However, handle receiver 110 (instead of being outside winch housing 150) is within housing 150. The top surface of handle receiver 110 is visible from within winch housing opening 155. Located between handle receiver 110 and winch housing 150 is seal 123. In this manner, a weather tight seal is created. As the top of handle receiver 110 is visible within winch housing opening 155, handle receiver recess 111 is also visible. Clutch handle 105 is located on top of winch housing 150. Winch handle protrusion 106 extends downwards from clutch handle 105 and engages receiver recess 111.

Clutch handle 105 can include an arrow to identify in what state the clutch is in. ENGAGED and FREE SPOOL can be printed on the outside of housing 150. Clutch state can be determined by the orientation of handle 105 and the labeling on the outside of housing 150.

Figure 10:
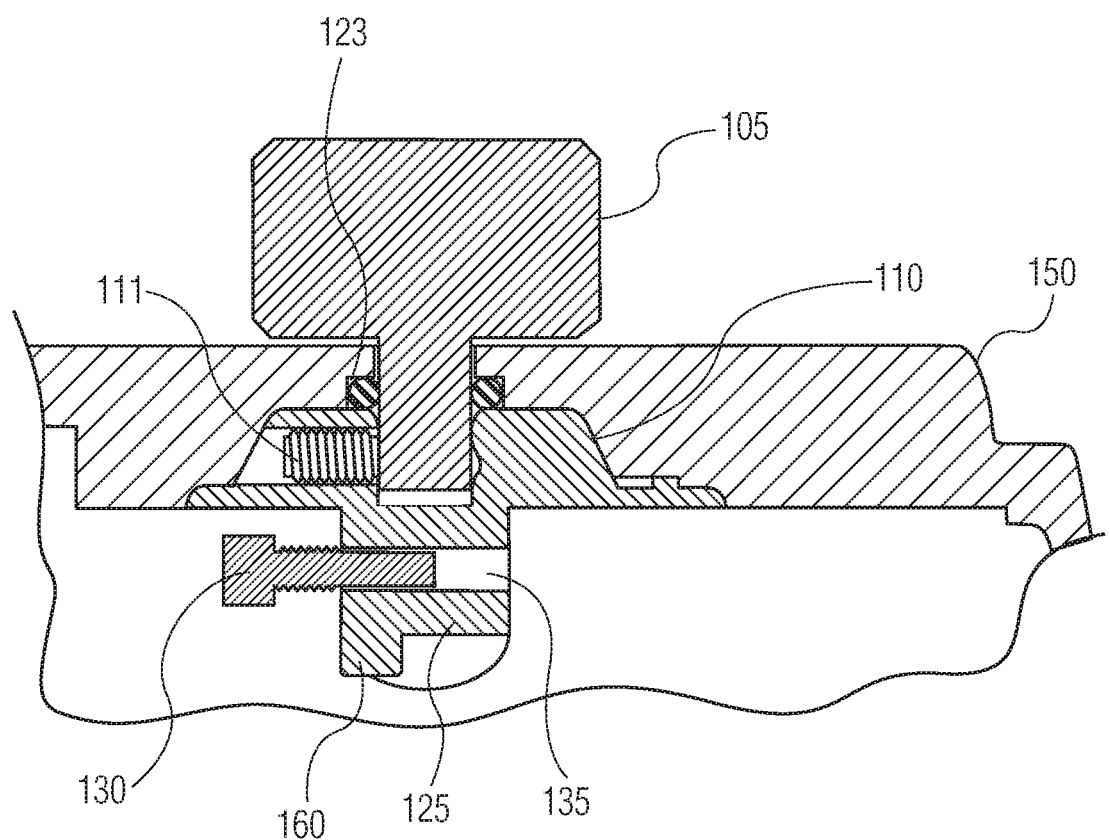
FIG. 10 is a cross sectional view of the further exemplary embodiment illustrated in FIG. 9.

FIG. 10 is a cross sectional view of the further exemplary embodiment illustrated in FIG. 9. Seal 123 is located between handle receiver 110 and winch housing 150. In this manner, even if clutch handle 105 is removed, the interior of winch housing 150 is sealed so that damaging penetration of elements (water, snow, humidity, dust, etc.) into winch housing 150 is prevented.

The above explanation has described upper retention member 115, but this is merely exemplary. For example, while upper retention member 115 has been described as being a set screw, for example, other ways for affixing clutch handle 105 to handle receiver 110 will be understood to one of ordinary skill in the art having seen the present application. For example, a spring loaded mechanism may be used so that depressing the mechanism causes it to "pop out" so that handle 105 can be removed. As another alternative, handle 105 may be attached to receiver 110 through a friction hold, a threaded hold, etc. As a further example, if handle receiver recess 111 is instead a male member (and winch handle protrusion 106 is replaced with a female member), then if clutch handle 105 is unavailable, handle receiver 110 can be rotated with a common house tool, such as a ratchet, lug wrench etc. This feature may be useful if handle 105 is lost or stolen, as a person using the winch can still disengage the motor from the spool by rotating handle receiver 110 with a common house tool.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A winch assembly having a gearbox, said winch assembly comprising:
 a handle receiver having at least a portion thereof exposed outside the gearbox;
 a seal between the handle receiver and the gear box;
 a winch gear in the gearbox, the winch gear driven by a motor;
 an engagement gear;
 a spool;
 a winch cable that wraps around the spool responsive to rotation of the spool;
 an engagement mechanism in the gearbox, the engagement mechanism coupled to the handle receiver to move with the handle receiver, wherein one movement of the engagement mechanism engages the engagement gear with the winch gear, and another movement of the engagement mechanism disengages the engagement gear from the winch gear;
 a winch handle selectively coupled to the handle receiver, wherein, movement of the winch handle causes movement of the handle receiver when attached, the winch handle detachable from the handle receiver, wherein the handle receiver or the engagement mechanism rotates within the seal;
 wherein when the engagement gear is engaged with the winch gear, actuation of the motor rotates the spool so that wrapping of the cable around the spool occurs,
 wherein the gearbox opening is sealed by the seal when the winch handle is detached from the handle receiver.

2. A winch assembly according to claim 1, wherein the handle receiver and winch handle has attachment sections that are male/female or female/male, respectively, for attachment therewith.

3. A winch assembly according to claim 2, wherein at least one of the attachment sections is polygon shaped.

4. A winch assembly according to claim 2, wherein at least one of the attachment sections slides on and off the other of the attachment sections.

5. A winch assembly according to claim 1, further comprising further male/female members for fixing the handle to the receiver.

6. A winch assembly according to claim 1, wherein the engagement mechanism includes an engagement member that laterally moves when the engagement member is rotated, wherein the lateral movement of the engagement member engages the winch gear.

7. A winch assembly according to claim 1, wherein the seal is between a wall of the gearbox and an exterior surface of the engagement member.

8. A winch assembly according to claim 1, wherein the seal is outside the gearbox.

9. A winch assembly according to claim 1, wherein the seal is inside the gearbox.

10. A method of removing a handle from a winch assembly having a gearbox, said method comprising the steps of:
 providing said winch handle assembly that includes:
 a handle receiver having at least a portion thereof exposed outside the gearbox;
 a seal between the handle receiver and the gear box;
 a winch gear in the gearbox, the winch gear driven by a motor;
 an engagement gear;
 a spool;
 a winch cable that wraps around the spool responsive to rotation of the spool;
 an engagement mechanism in the gearbox, the engagement mechanism coupled to the handle receiver to move with the handle receiver, wherein one movement of the engagement mechanism engages the engagement gear with the winch gear, and another movement of the engagement mechanism disengages the engagement gear from the winch gear;
 a winch handle selectively coupled to the handle receiver, wherein, movement of the winch handle causes movement of the handle receiver when attached, the winch handle detachable from the handle receiver, wherein the handle receiver or the engagement mechanism rotates within the seal;
 wherein when the engagement gear is engaged with the winch gear, actuation of the motor rotates the spool so that wrapping of the cable around the spool occurs,
 detaching the winch handle from the handle receiver while maintaining the gearbox opening sealed by the seal.

11. A method according to claim 10, wherein the handle receiver and winch handle has attachment sections that are male/female or female/male, respectively, for attachment therewith.

12. A method according to claim 11, wherein at least one of the attachment sections is polygon shaped.

13. A method according to claim 11, wherein at least one of the attachment sections slides on and off the other of the attachment sections.

14. A method according to claim 10, further comprising further male/female members for fixing the handle to the receiver.

15. A method according to claim 10, wherein the engagement mechanism includes an engagement member that laterally moves when the engagement member is rotated, wherein the lateral movement of the engagement member engages the engagement gear with the winch gear.

16. A method according to claim 10, wherein the seal is between a wall of the gearbox and an exterior surface of the engagement member.

17. A method according to claim 10, wherein the seal is outside the gearbox.

18. A method according to claim 10, wherein the seal is inside the gearbox.

19. A winch assembly according to claim 1, wherein the engagement gear moves towards the winch gear in order for the engagement gear and the winch gear to become engaged so that power from the motor is transmitted to the spool so that the cable is wrapped around the spool, and the engagement gear moves away from the winch gear in order for the engagement gear and the winch gear to become disengaged so that the motor and the spool are disengaged.

20. A method according to claim 10, wherein the engagement gear moves towards the winch gear in order for the engagement gear and the winch gear to become engaged so that power from the motor is transmitted to the spool so that the cable is wrapped around the spool, and the engagement gear moves away from the winch gear in order for the engagement gear and the winch gear to become disengaged so that the motor and the spool are disengaged.

\* \* \* \* \*